Dec. 1, 1964 R. H. REESE 3,158,922
INDEXABLE BLADE POCKET MILL
Filed April 16, 1962
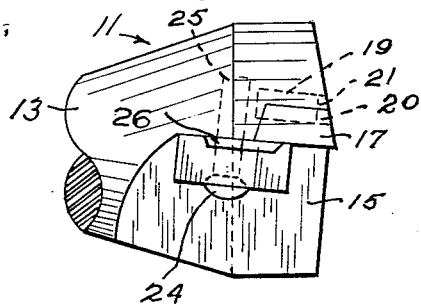
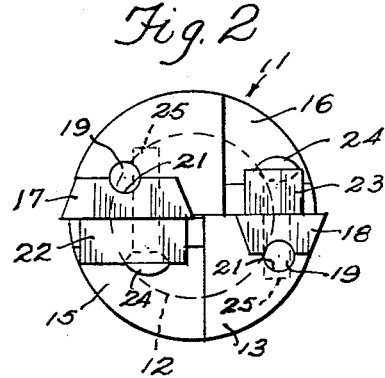
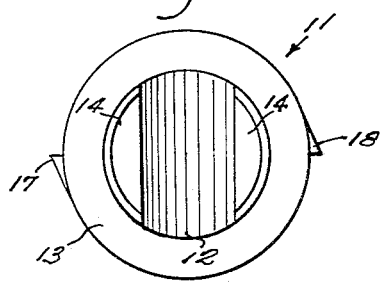
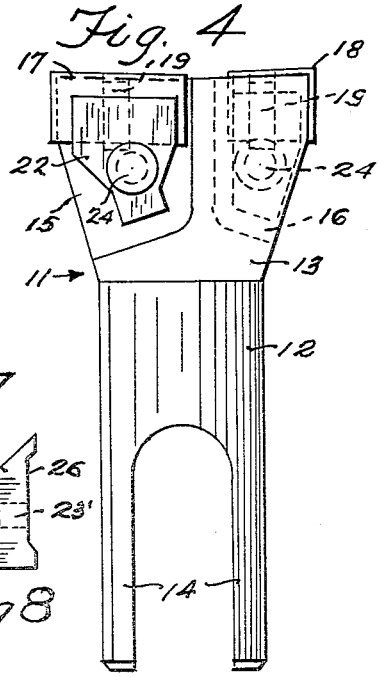
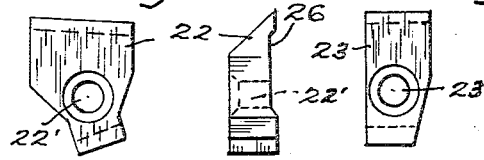
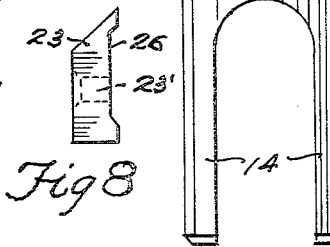
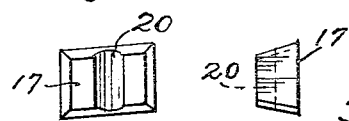
INVENTOR.
Ray H. Reese

United States Patent Office 3,158,922
Patented Dec. 1, 1964

3,158,922
INDEXABLE BLADE POCKET MILL
Ray H. Reese, 409 Ridgewood Ave., Dayton 9, Ohio
Filed Apr. 16, 1962, Ser. No. 187,868
1 Claim. (Cl. 29—105)

The present invention relates to a novel indexable blade pocket mill.

Generally, there is provided a tool having a shank receivable in a conventional chuck and an enlarged coaxial head. The head is provided with diametrically located recesses having flat bottoms defining seats for quickly and easily removable multiple edged high speed tool blades, representing a fraction of the cost of a tool of conventional construction, either new or rebuilt. Each blade is reversible so as to double the life thereof, and the seats and blades are provided with coaxial semi-cylindrical grooves which accurately position the blades by cylindrical dowel pins laid in the grooves. The blades are removably fixed to the seats by clamp plates fastened to the head by screws passing through aligned bores in the clamps and head, the bores in the latter being tapped.

The term "pocket milling" is used by industry to identify a type of milling operation which removes stock from a piece of material, thus forming a pocket, crevice or indentation in the piece of material. A principal use of this type of operation is in the aircraft industry where excessive stock is removed from a piece of material so as to reduce its weight without sacrificing strength and rigidity. This operation and the tool itself are not limited to the aircraft industry but can be used wherever a similar operation is desirable.

Pocket mills can be used in any and all types of machines using any type of end mill, router, etc. They can be used on machines which are manually operated, mechanically operated, tape-control operated, or electronically or hydraulically operated.

It is, accordingly, an object of the invention to provide a more versatile tool of the type described, improve its cutting action and reduce its cost, by replacing now existing pocket mill tools manufactured by brazing carbide tips to the tools.

It is another object of the invention to eliminate the present costly operation of re-tipping and re-grinding pocket mills by the brazing method.

It is a further object of the invention to substitute for conventional brazing quickly and easily detachable mechanical means for attaching the removable and reversible blades to the tool, thus eliminating the life-reducing (fracturing) effect of the intense heat of brazing on tool blades.

It is yet another object of the invention to provide an indexable blade milling tool having two cutting edges on each blade, thus doubling the life and halving the cost.

It is a further object of the invention to greatly reduce the number of "stand-by" cutters needed by a user to around a third or fourth of the number of conventional "stand-by" cutters normally required.

It is another object of the invention to provide a pocket mill tool which can be retipped without removing the tool shank from the machine and in which the replacement blades are accurately positioned by simple and inexpensive dowel pins.

Other and further objects of the invention will become apparent from a reading of the following specification, taken in conjunction with the drawing, in which:

FIGURE 1 is a side elevational view of a preferred embodiment of the invention;

FIGURE 2 is a front end elevational view of the tool of FIGURE 1;

FIGURE 3 is a rear end view of the tool of FIGURES 1 and 2;

FIGURE 4 is a plan view from below of the complete tool of FIGURE 2;

FIGURE 5 is a plan view of one of the blade clamps;

FIGURE 6 is a side view of the clamp of FIGURE 5;

FIGURE 7 is a plan view of another (smaller) blade clamp;

FIGURE 8 is a side view of the clamp of FIGURE 7;

FIGURE 9 is a bottom plan view of one of the indexable removable blades; and,

FIGURE 10 is an end view of the blade of FIGURE 9.

With reference to the drawing, numeral 11 generally designates the complete tool. Tool 11 comprises a cylindrical shank portion 12 and an integral coaxial conically tapered enlarged head portion 13. Shank 12 is bifurcated at its free end to provide fingers 14 which straddle an element of known construction in a chuck (both not shown) for preventing rotation of shank 12 in the socket of the chuck.

A pair of diametrically opposite recesses 15 and 16 is formed in head 13. Recess 15 is deeper than recess 16 so that a removable blade 17 seated therein can have a radial extent greater than the radius of the bore cut by said blade and a smaller removable blade 18, to insure good cutting action at the axis of the bore.

The seats formed by the recesses are so positioned that the cutting edges of blades 17 and 18 are approximately diametrically aligned, as shown in FIGURE 2. The seats are also oppositely tilted several degrees from the axes of the tool, 6° as shown in FIGURE 1. The cutting edges of the lbades are formed by surfaces ground at an acute angle to the seat face of the blades, shown as 77° in FIGURES 1 and 2.

Removable blades 17 and 18 are of parallelogram configuration in plan view with their forward edges tilted at about 2° from the diameter of the tool head, FIGURES 4 and 9, so that the outer corners of the blades lead the inner corners thereof slightly during the cutting operation. And while such blades when formed of carbide material have been found to be highly efficient, it is to be understood that other materials, as for example, high speed steels, ceramics and the like which meet milling operation requirements are also contemplated.

Blades 17 and 18 are accurately held in desired cutting orientation by a pair of cylindrical dowel pins 19 which lie in mating semicylindrical grooves 20 and 21 cut parallel to the axis of tool 11 and in the contacting surfaces of the blades and the seats formed by the bottoms of recesses 15 and 16.

Blades 17 and 18 are clamped against their respective seats by clamps 22 and 23 which are provided with medially located countersunk bores to receive the shanks and tapered heads of screws 24, the threaded ends of which are received in aligned tapped bores 25 in the seat portions of the recesses 15 and 16, FIGURES 1 and 2. Clamps 22 and 23 have their clamping surfaces hollow-ground at 26 to locate their clamping action medially of the blades so as to prevent any tendency of the latter to rock during a cutting operation.

While the foregoing presents preferred embodiments of the present invention, it is obvious that other modifications and/or equivalents may be employed without departing from the scope of the invention, which is defined in the appended claim.

What is claimed is:

A removable blade milling tool comprising a shank portion, a head portion, said head portion having a pair of recesses therein provided with seat-forming surfaces, one of said recesses being deeper than the other, reversible blades having opposed cutting edges and removably clamped to said seat-forming surfaces, the blade in said deeper recess having a greater width than the blade in the other recess whereby the cutting action of one blade overlaps the cutting action of the other, said blades having their inner cutting edges in abutting relation to adjacent seating surfaces in said recesses, said blades and surfaces having aligned indexing grooves in their mating faces, said grooves extending in parallel relation to the longitudinal axis of said tool, a clamp mounted outwardly of each blade in its associated recess, a screw extending through each clamp and its associated blade and threadably connected to said head, and dowel pins coaxially embraced by said grooves to accurately index said blades, whereby said opposed cutting edges can be sequentially used to double the lives thereof and whereby said blades can be quickly and easily replaced without removing said tool from a machine mounting the same.

References Cited in the file of this patent
UNITED STATES PATENTS

| | | |
|---|---|---|
| 104,055 | Munro | June 7, 1870 |
| 275,890 | Cross | Apr. 17, 1883 |
| 3,057,043 | Hussey | Oct. 9, 1962 |